No. 663,885. Patented Dec. 18, 1900.
W. S. HALSEY.
VALVE GEAR.
(Application filed June 20, 1900.)
(No Model.) 5 Sheets—Sheet 1.

WITNESSES: INVENTOR,
James C Herron. William S. Halsey,
S. R. Bell. by Snowden Bell,
Att'y.

THE NORRIS PETERS CO., PHOTO-LITHO., WASHINGTON, D. C.

No. 663,885. Patented Dec. 18, 1900.
W. S. HALSEY.
VALVE GEAR.
(Application filed June 20, 1900.)
(No Model.) 5 Sheets—Sheet 2.

WITNESSES: INVENTOR,

No. 663,885. Patented Dec. 18, 1900.
W. S. HALSEY.
VALVE GEAR.
(Application filed June 20, 1900.)
(No Model.) 5 Sheets—Sheet 5.
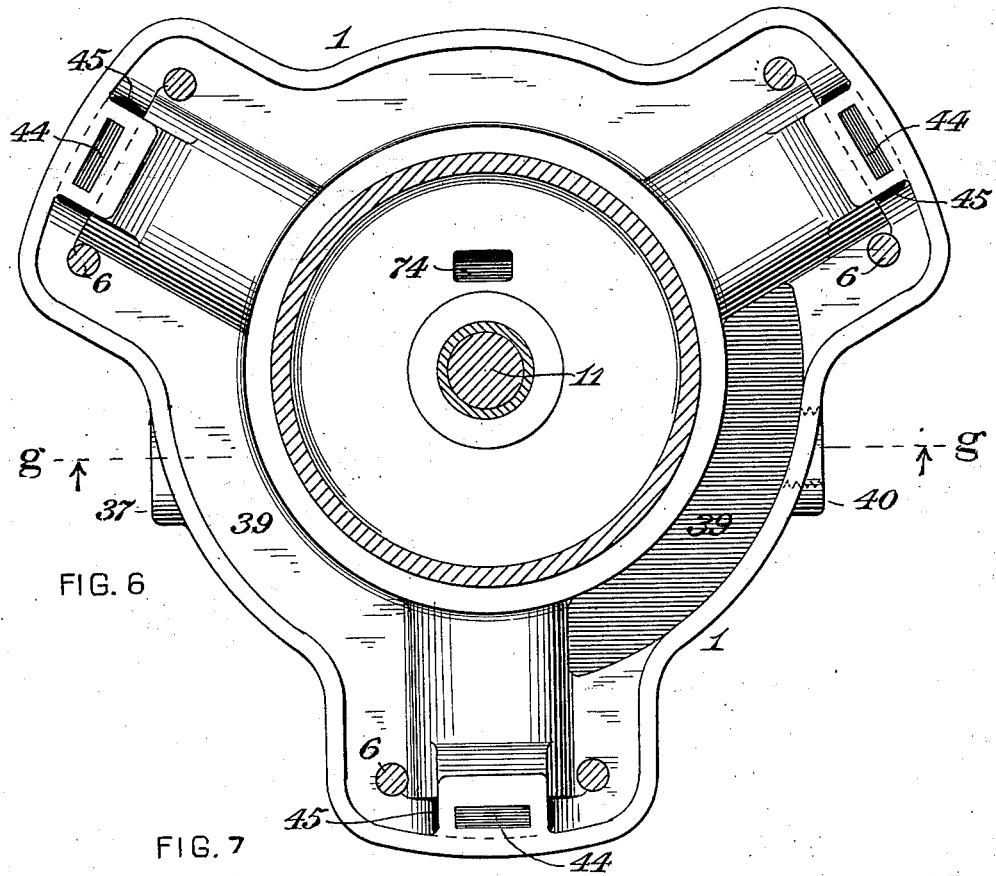
FIG. 6
FIG. 7
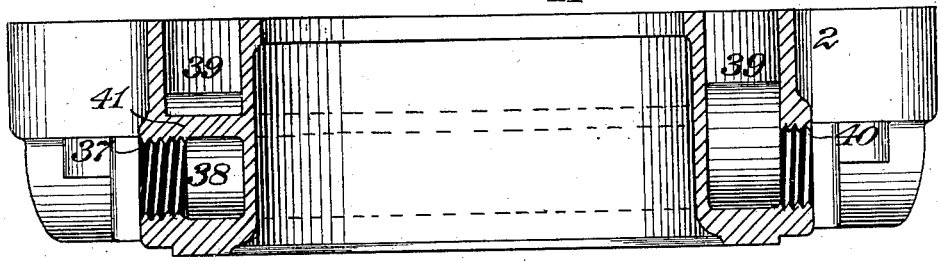
FIG. 8
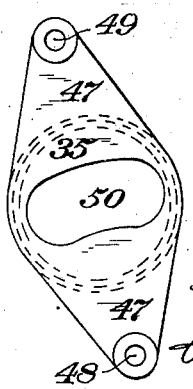
WITNESSES: INVENTOR,
James C. Herron. William S. Halsey.
S. R. Bell. by J. Howden Bell
Att'y.
THE NORRIS PETERS CO., PHOTO-LITHO., WASHINGTON, D. C.

UNITED STATES PATENT OFFICE.

WILLIAM S. HALSEY, OF PITTSBURG, PENNSYLVANIA.

VALVE-GEAR.

SPECIFICATION forming part of Letters Patent No. 663,885, dated December 18, 1900.

Application filed June 20, 1900. Serial No. 21,023. (No model.)

*To all whom it may concern:*

Be it known that I, WILLIAM S. HALSEY, of Pittsburg, in the county of Allegheny and State of Pennsylvania, have invented a certain new and useful Improvement in Valve-Gear for Fluid-Pressure Motors, of which improvement the following is a specification.

The object of my invention is to provide a simple, compact, and effective valve-gear for an engine or motor actuated by compressed air or other fluid under pressure, which shall be capable of ready and certain reversal and provide proper facilities for automatic cut-off regulation of the fluid-supply and which shall, further, have its members substantially supported and covered and protected, while being readily accessible whenever required.

The improvement claimed is hereinafter fully set forth.

Figures 1, 9:
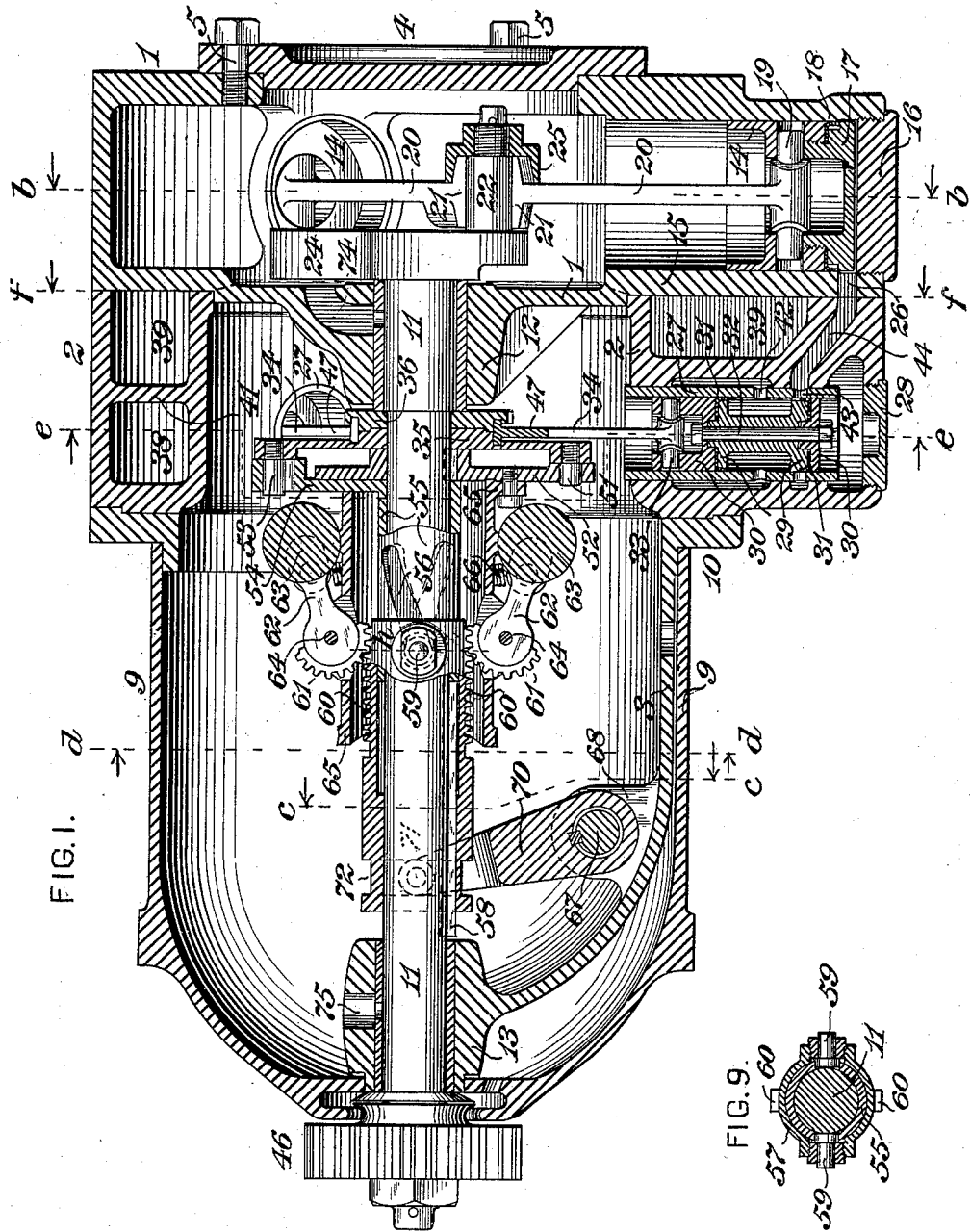
Figure 2:
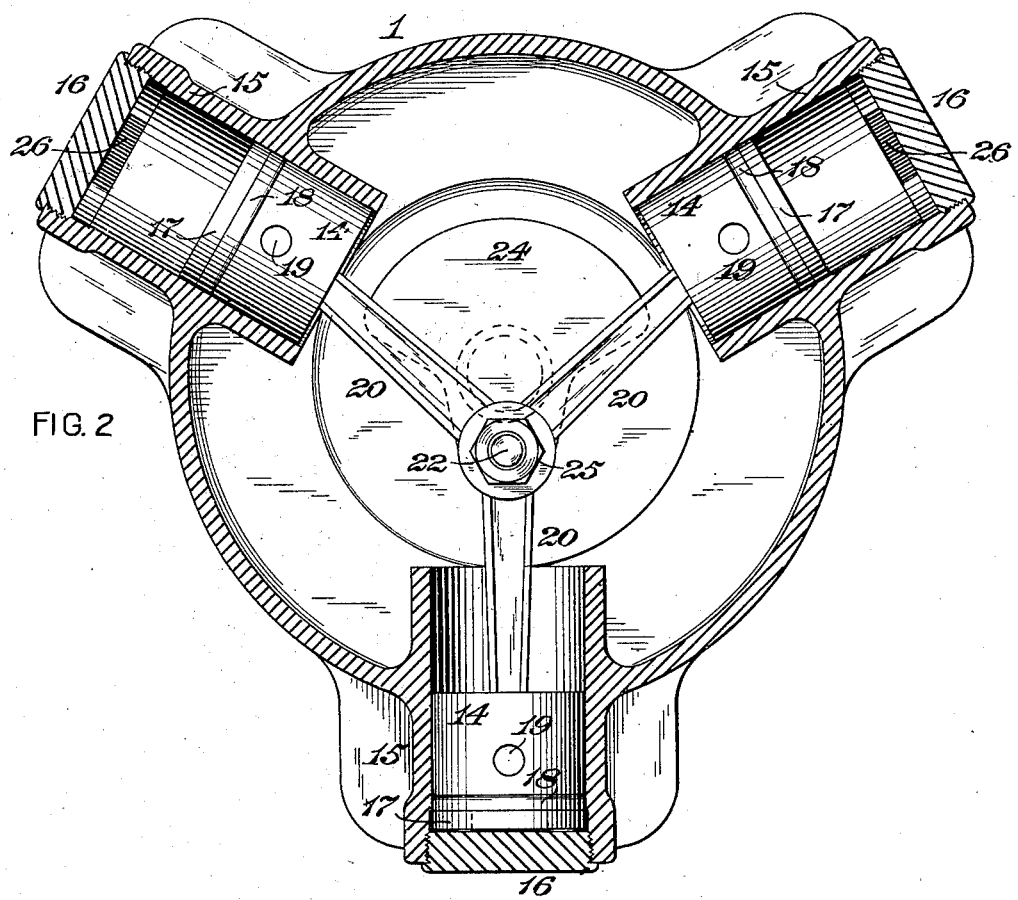
Figure 3:
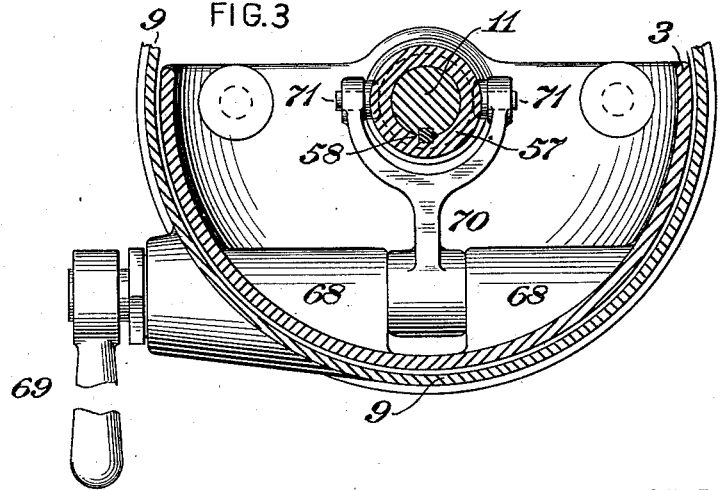
Figure 4:
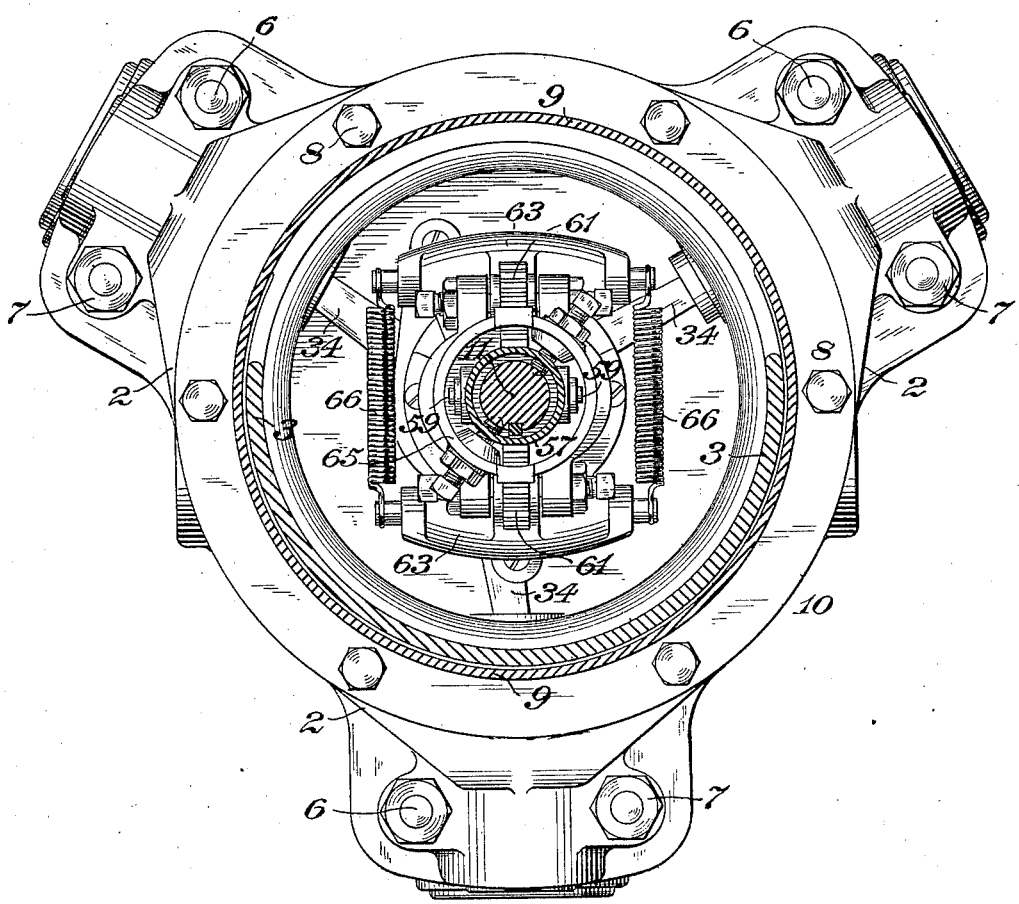
Figure 5:
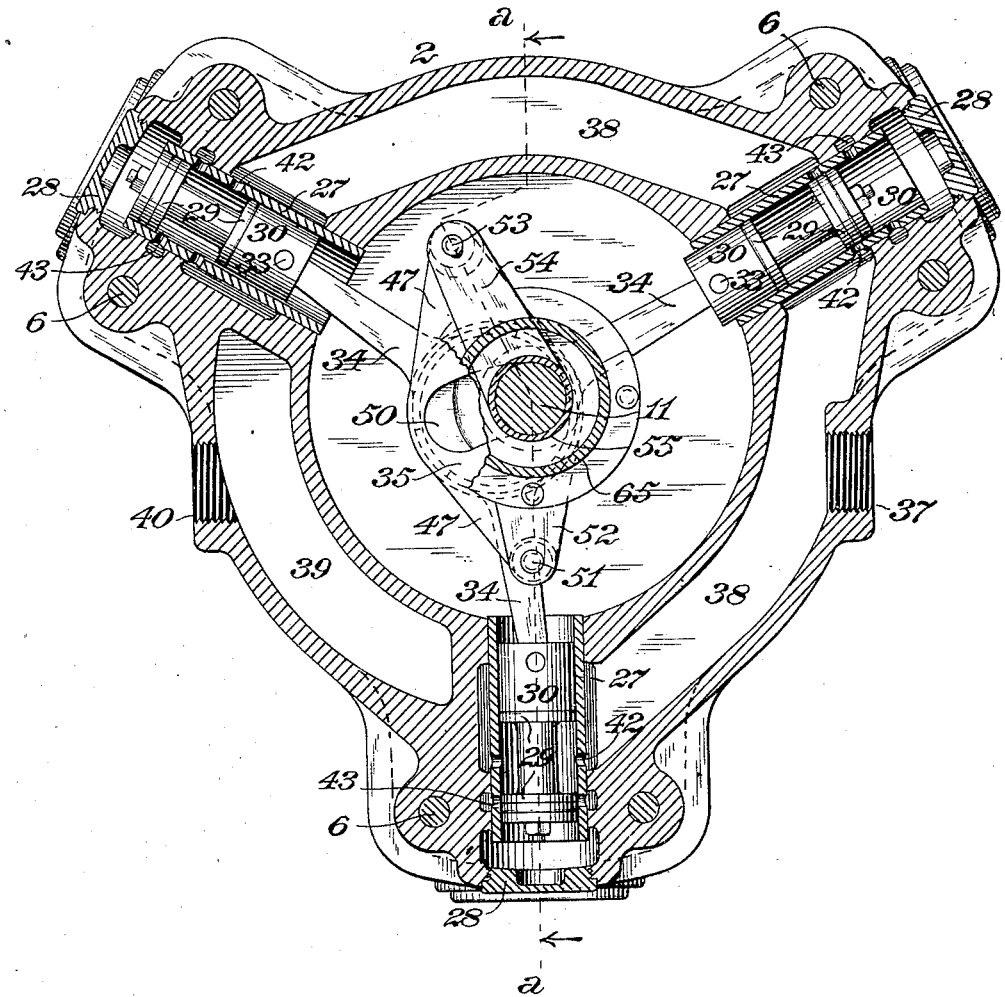

In the accompanying drawings, Figure 1 is a longitudinal section through a fluid-pressure motor, illustrating an application of my invention at the line $a\,a$ of Fig. 5; Figs. 2 to 6, inclusive, transverse sections through the same at the lines $b\,b$, $c\,c$, $d\,d$, $e\,e$, and $f\,f$, respectively, of Fig. 1; Fig. 7, a longitudinal section at the line $g\,g$ of Fig. 6; Fig. 8, a plan view of the eccentric as seen from the left in Fig. 1, and Fig. 9 a transverse section through the driving-shaft and accessories at the line $h\,h$ of Fig. 1.

In the practice of my invention I provide for the reception and support of the working members of the motor on which my invention is applied a suitable main casing or frame, which in this instance shown is composed of a cylinder-section 1, a valve-chest section 2, and an outer bearing-section 3, which are connected in line axially. A central opening is formed in the outer end of the cylinder-section 1 and is closed by a removable door or bonnet 4, which is secured in position by bolts 5. The adjoining faces of the several sections are finished truly, so as to make tight joints when brought into contact, and the valve-chest section 2 is secured to the cylinder-section 1 by bolts 6, passing through lugs on the valve-chest casing and provided with nuts 7. The outer bearing-section 3 is secured to the valve-chest section 2 by bolts 8. A casing 9 incloses and is secured to the outer bearing-section and makes a tight joint with an end flange 10 on said section, through openings in which flange the connecting-bolts 8 pass. A main or driving shaft 11 is journaled in a main bearing 12, formed integral with or secured to the central portion of the inner end of the cylinder-section 1, and in an outer bearing 13, fixed to the outer end of the outer bearing-section 3. A gear-wheel 46, fixed upon the end of the driving-shaft which projects through the casing 9, serves to transmit the rotation thereof to the mechanism desired to be actuated by the motor. Rotation is imparted to the driving-shaft through connections with a plurality of single-acting pistons 14, (three being employed in the instance shown,) which are fitted to reciprocate in cylinders 15, formed upon and projecting radially from the cylinder-section 1. The inner ends of the cylinders 15 are open to the inside of the cylinder-section and their outer ends are closed by removable heads 16. Followers 17 are secured to the outer ends of the pistons 14, and suitable packing 18 is interposed between the pistons and followers. Connecting-rod pins 19 are fitted in the pistons, and connecting-rods 20 are coupled at their outer ends to said pins. The inner ends of the connecting-rods 20 are provided with segmentally-recessed heads 21, bearing on a crank-pin 22, which is formed upon or secured to a crank 23 on the adjacent end of the driving-shaft, said crank being preferably provided with a proper counterbalance 24. The heads 21 of the connecting-rods are tapered or inclined on their outer surfaces and are maintained in proper relation to the crank-pin by a correspondingly-tapered cap 25, which is internally threaded and engages a thread on the end of the crank-pin.

Motive fluid is admitted to and exhausted from the several cylinders 16 through induction and eduction ports 26, one of which is formed in the wall of each cylinder adjacent to its outer end, the port 26 of each cylinder being controlled by one of a plurality of distribution-valves corresponding in number with the cylinders and fitted to reciprocate in a plane parallel therewith in the valve-chest section 2 of the casing. The distribution-valves, which are of the piston type, work in valve casings or bushings 27, which are open at each of their ends and are fitted in corresponding radial openings in the casing-section 2, the outer ends of which openings are closed by removable heads 28 to admit of the insertion and removal of the valves and valve-casings, as desired. Each of the distribution-valves is composed of two end heads or pistons 29, connected by an intermediate tubular body and provided with followers 30, between which and the pistons suitable packing 31 is interposed. The pistons and followers are secured together in line axially by stems 32. Eccentric-rod pins 33 are fitted in the followers at the inner ends of the distribution-valves, and eccentric-rods 34 are coupled at their outer ends to the pins 33. The inner ends of the eccentric-rods are provided with segmentally-recessed heads similar to those of the connecting-rods 20, before described, said heads fitting in circular grooves formed in the abutting faces of an eccentric 35, fitted, with the capacity of movement transversely thereto, on the driving-shaft 11 and of a cap-plate 36, secured to the eccentric. A supply-pipe (not shown) is led from a suitable reservoir or other source of fluid-pressure supply to a connection with a supply-nozzle 37, opening into a supply-passage 38, which extends circumferentially sufficiently far around the casing 2 for slightly less than half the depth thereof to enable communication to be made between it and each of the valve-casings 27. An exhaust-passage 39 extends circumferentially entirely around the casing-section 2, said passage adjoining but being separated by a transverse partition 41 from the supply-passage 38 and being of nearly the full depth of the casing-section throughout the portion thereof where the supply-passage does not extend and of slightly less than half the depth of the section throughout the remaining portion thereof. A suitable exhaust-pipe may be connected to an exhaust-nozzle 40 on the outer wall of the exhaust-passage 39. The supply-passage 38 is in communication (controlled by the distribution-valves) with the interior spaces of the valve-casings 27 by ports 42 in the walls thereof, and ports 43, located between the ports 42 and the outer ends of the valve-casings, are in communication (also controlled by the distribution-valves) through passages 44 in the section 2 with the induction and eduction passages 26 of the cylinders 15. The spaces at the outer ends of the valve-casings 27 communicate with the exhaust-passage 39 through continuously-open passages 45, on opposite sides of the passages 44. Motive fluid from the supply-passage 38 passes into the spaces between the pistons of the distribution-valves through the ports 42 and is admitted to the cylinders 15 on the outer sides of the pistons thereof when the ports 42 and 43 are brought into communication by the distribution-valves. Motive fluid is exhausted from the cylinders when the ports 43 are brought into communication by the distribution-valves with the spaces at the outer ends of the valve-casings and the communicating passages 45 and exhaust-passage 39.

The eccentric 35 is provided with two oppositely-extending arms 47 47, having sockets 48 49 near their ends for the reception of connecting-pins, presently to be described, and a curved slot 50, which is struck from one of the sockets 48 as a center, extends transversely through the central portion of the eccentric and the connected cap-plate 36. The width of said slot is such as to enable the shaft 11 to pass freely through it, and its function is to permit the eccentric to be moved transversely to the shaft for the purpose of effecting reversal of movement of the shaft or variation of the degree of expansion or point of cut-off, as may from time to time be desired. The eccentric is pivoted by a pin 51, which is secured in the socket 48 of one of its arms 47 to an arm 52, which is keyed fast to the shaft 11, and the opposite arm 47 of the eccentric is pivoted by a pin 53, which is secured in the socket 49 to an arm 54, formed upon an eccentric-turning sleeve 55, which is fitted to turn freely on the shaft 11 and in which are formed two opposite helical or cam grooves 56. A portion of the eccentric-turning sleeve 55 fits freely within an adjusting-sleeve 57, which is fitted to traverse longitudinally on a key or feather 58 on the shaft without rotating independently thereof and may be moved in either direction either manually or by an automatic cut-off governor. Two diametrically opposite adjusting-pins 59, fixed in the adjusting-sleeve 57, engage the cam-grooves 56 of the sleeve 55 and rotate said sleeve around the shaft in one or the other direction when the sleeve 57 is moved longitudinally on the shaft in one or the other direction, respectively. Racks 60 are formed on the periphery of the adjusting-sleeve 57 at and near its end which adjoins the sleeve 55, said racks engaging segment-gears 61 on governor-arms 62, which carry centrifugally-acting weights 63 on their opposite ends and are pivoted by pins 64 to a sleeve 65, which is of larger diameter than the adjusting-sleeve 57 and is secured at one end to the arm 52, which, as before explained, is keyed to the shaft. The governor-arms 62 are coupled one to the other by centripetally-acting springs 66. Outward movement of the weights 63, under the action of centrifugal force due to increase of fluid-pressure or diminution of load, will through the segmental gears 61 and racks 60 move the adjusting-sleeve 57 in the direction of the eccentric 35 and through the action of the adjusting-pins 59 upon the cam-grooves 56 will turn the eccentric in direction to reduce the supply of motive fluid to the cylinders by reducing the throw of the eccentric, and consequently the travel of the distribution-valves. Upon increase of load or diminution of fluid-pressure the springs 66 will draw the governor-arms inwardly and through the segment gears and racks will effect the movement of the sleeve 57 in the opposite direction and correspondingly turn the eccentric into a position of greater throw, thereby increasing the supply of motive fluid to the cylinders.

In order to enable the direction of rotation of the shaft 11 to be manually reversed, a reversing-shaft 67 is journaled transversely to the shaft 11 in bearings 68 in the outer bearing-section 3, said reversing-shaft carrying upon one of its ends a reversing lever or handle 69 and having a reversing-arm 70 keyed upon its middle portion. The free end of the reversing-arm is forked so as to span the driving-shaft 11, and pins 71, fixed in its forked end portions, fit freely in a circumferential groove 72 in the adjusting-sleeve 57. By swinging the reversing-shaft in its bearings by the lever 69 in one or the other direction, respectively, corresponding longitudinal movement will be imparted to the adjusting-sleeve, and thence through the connections before described to the eccentric 35, which is thereby moved into position to effect the rotation of the shaft in the direction desired.

The several sections of the frame or casing 1 2 3 being, as before stated, connected with tight joints, the casing is designed to be filled either completely or partially with oil, which may be introduced through one or more suitably-located filling-openings provided with removable plugs. The moving parts will thus be continuously in contact with and lubricated by the oil in the interior of the casing, access of which to the bearings 12 13 of the driving-shaft is afforded by passages 74 75.

Under the construction hereinbefore described the valve-gear of a high-speed motor of comparatively large power may be placed within a small compass and be firmly supported and covered and protected from the access of dirt and contact with extraneous objects, while being readily accessible for renewal and repair, as may be desired. The governor cut-off effects automatic regulation of speed and enables the motive fluid to be economically utilized under the proper degree of expansion, and the reversing mechanism admits of the reversal of the motor without necessitating a preliminary stoppage or slowing down.

I claim as my invention and desire to secure by Letters Patent—

1. In a fluid-pressure motor, the combination of a frame or casing, a motor-cylinder fixed thereto, a driving-shaft journaled thereon, a crank on said driving-shaft, a piston fitting said cylinder, a connection from the piston to the crank, a distribution-valve controlling the supply and exhaust of motive fluid to and from the piston, an eccentric fitted freely on, and movable transversely to, the driving-shaft, and provided with two oppositely-projecting arms, a connection from the eccentric to the distribution-valve, an arm fixed to the driving-shaft and pivoted to one of the arms of the eccentric, an eccentric-turning sleeve fitted to move circumferentially upon the driving-shaft and having a radial arm pivoted to the adjoining arm of the eccentric, peripheral cam-grooves in the eccentric-turning sleeve, an adjusting-sleeve fitted to traverse longitudinally, but not circumferentially, upon the driving-shaft, pins on said sleeve engaging the cam-grooves of the eccentric-turning sleeve, and means for imparting longitudinal movement, in either direction, to the adjusting-sleeve.

2. In a fluid-pressure motor, the combination of a frame or casing, a motor-cylinder fixed thereto, a driving-shaft journaled thereon, a crank on said driving-shaft, a piston fitting said cylinder, a connection from the piston to the crank, a distribution-valve controlling the supply and exhaust of motive fluid to and from the piston, an eccentric fitted freely on, and movable transversely to, the driving-shaft, a connection from the eccentric to the distribution-valve, an eccentric-turning sleeve fitted to move circumferentially upon the driving-shaft, connections coupling said sleeve with the eccentric, peripheral cam-grooves in said sleeve, an adjusting-sleeve fitted to traverse longitudinally, but not circumferentially, upon the driving-shaft, pins on said sleeve engaging the cam-grooves of the eccentric-turning sleeve, a governor supported on and rotating with the driving-shaft, and connections through which longitudinal movement, in either direction, may be imparted to the adjusting-sleeve by the governor.

3. In a fluid-pressure motor, the combination of a frame or casing, a motor-cylinder fixed thereto, a driving-shaft journaled thereon, a crank on said driving-shaft, a piston fitting said cylinder, a connection from the piston to the crank, a distribution-valve controlling the supply and exhaust of motive fluid to and from the piston, an eccentric fitted freely on, and movable transversely to, the driving-shaft, a connection from the eccentric to the distribution-valve, an eccentric-turning sleeve fitted to move circumferentially upon the driving-shaft, connections coupling said sleeve with the eccentric, peripheral cam-grooves in said sleeve, an adjusting-sleeve fitted to traverse longitudinally, but not circumferentially, upon the driving-shaft, pins on said sleeve engaging the cam-grooves of the eccentric-turning sleeve, a reversing-shaft journaled on the frame transversely to the driving-shaft, a reversing-arm fixed to the reversing-shaft, and pins on said arm engaging a circumferential groove on the adjusting-sleeve.

WILLIAM S. HALSEY.

Witnesses:
J. SNOWDEN BELL,
CLARENCE A. WILLIAMS.